United States Patent [19]

Ohta et al.

[11] Patent Number: 5,375,468
[45] Date of Patent: Dec. 27, 1994

[54] ACCELERATION SENSOR UNIT HAVING SELF-CHECKING FUNCTION

[75] Inventors: Fumio Ohta, Yokkaichi; Nobuo Tanaka; Akira Gohkura, both of Tokyo, all of Japan

[73] Assignee: Mitsubishi Petrochemical Co., Ltd., Tokyo, Japan

[21] Appl. No.: 914,867

[22] Filed: Jul. 16, 1992

[30] Foreign Application Priority Data

Jul. 19, 1991 [JP] Japan .................. 3-179124

[51] Int. Cl.⁵ ............... G01P 15/09; G01P 21/00
[52] U.S. Cl. .................. 73/517 AV; 73/1 D
[58] Field of Search ........ 73/1 D, 1 B, 1 DV, 517 R, 73/517 AV

[56] References Cited

U.S. PATENT DOCUMENTS

| | | | |
|---|---|---|---|
| 3,911,391 | 10/1975 | Held et al. | 340/669 X |
| 4,297,888 | 11/1981 | Hirai et al. | 73/664 |
| 4,395,908 | 8/1983 | Shopland | 73/516 LM |
| 4,520,669 | 6/1985 | Rider | 73/510 |
| 4,615,209 | 10/1986 | Change, Jr. | 73/DIG. 4 X |
| 4,700,973 | 10/1987 | Gademann et al. | 73/516 R X |
| 4,950,914 | 8/1990 | Kurihara et al. | 307/10.1 |
| 5,130,600 | 7/1992 | Tomita et al. | 73/654 X |
| 5,181,011 | 1/1993 | Okano | 340/438 |

FOREIGN PATENT DOCUMENTS

| | | | |
|---|---|---|---|
| 401669 | 12/1990 | European Pat. Off. | 73/517 R |
| 4142425 | 7/1992 | Germany | 73/1 D |
| 248865 | 10/1990 | Japan | 73/517 R |
| 6462 | 1/1991 | Japan | 73/517 R |
| 6463 | 1/1991 | Japan | 73/517 R |
| 150714 | 10/1962 | U.S.S.R. | 73/517 R |

*Primary Examiner*—Tom Noland
*Attorney, Agent, or Firm*—David O'Reilly

[57] ABSTRACT

This invention relates to an acceleration sensor system having a self-checking operation of an air bag safety system while a vehicle is being driven. An acceleration sensor element suitable for self-checking while a vehicle is driven is obtained by a planar piezoelectric element supported so that it can vibrate, a detecting electrode provided on an upper face of the planar piezoelectric element, and an actuator to add vibrations at a predetermined frequency to the planar piezoelectric element. A sensitivity checking circuit generates a sensitivity checking signal representing sensitivity of an acceleration sensed from a detected signal. A signal processing circuit generates an acceleration signal representing the applied acceleration to the acceleration sensor from the detected signal. An operation checking circuit generates a self-checking signal representing the operational state of the acceleration sensor system by checking the operation of the signal processing circuit and the acceleration sensor from the acceleration signal and the sensitivity checking signal.

7 Claims, 2 Drawing Sheets

5,375,468

ACCELERATION SENSOR UNIT HAVING SELF-CHECKING FUNCTION

FIELD OF THE INVENTION

This invention relates to an acceleration sensor system having a self-checking (diagnostic) circuit capable of self-checking an air bag system actuated at a collision of a vehicle and to soften the impact acting on the driver, and more particularly relates to sensing the impact at a collision by an acceleration sensor and if the impact exceeds a set value, inflating an air bag built into the steering wheel for absorbing the impact acting on the driver etc.

BACKGROUND OF THE INVENTION

Heretofore, an acceleration sensor system used for an air bag system is generally comprised of an acceleration sensor unit having a piezoelectric element provided with electrodes on opposite faces and generating a collision signal upon the collision of a vehicle, and an amplifier circuit amplifying the collision signal generated from this unit. In this prior art, impact upon the collision of a vehicle is detected by an acceleration sensor unit and the collision signal is amplified by an amplifier circuit and fed to air bag system for actuating it.

However, in the prior art, it is necessary to check its function even if a highly reliable acceleration sensor unit is employed because it concerns human life.

Summary of the Invention

It is an object of the present invention to provide an acceleration sensor unit in which it is possible to check not only the sensor unit itself and the function of an actuator but is capable of a self-checking its electronic circuit and related electric source circuit.

To achieve the object, this invention provides an acceleration sensor unit having self-checking circuit comprising acceleration sensor unit 5 having piezoelectric element 1, piezoelectric actuator 6 attached to supporting frame 4 of acceleration sensor unit 5, oscillating circuit 7 to supply oscillation signal $S_1$ to piezoelectric vibrator actuator 6, amplifier circuit 8 to amplify the signal which is proportional to oscillation signal $S_1$ output from the sensor unit 5 and is generated vibration of actuator 6, collision signal $S_2$ generated at the collision of a vehicle and superimposed offset signal $S_3$. Offset checking circuit 9 inputs collision signal $S_2$, offset signal $S_3$ and outputs offset checking signal voltage $S_4$ representing the offset signal $S_3$ being normal or not. Sensor sensitivity checking circuit 10 inputs oscillation signal $S_1$ and outputs sensor sensitivity signal $S_5$ representing the oscillation signal $S_1$ being normal or not. Abnormal checking circuit 25 generates self-checking signal $S_6$ representing the whole operational state from the added signal of offset checking signal voltage $S_4$ and sensor sensitivity signal $S_5$.

Oscillating signal $S_1$ generated by self oscillator circuit 7 is impressed on piezoelectric actuator 6 attached to acceleration sensor unit 5. Piezoelectric actuator 6 vibrates at a vibration frequency proportional to oscillating signal $S_1$. This vibration makes the oscillating signal $S_1$ detected from electrode 2A of accelertion sensor unit 5. By detecting oscillating signal $S_1$, sensor unit 5 is checked for normal operates.

On the other hand, collision signal $S_2$ is amplified by amplifier circuit 8 together with offset signal $S_3$, and amplified collision signal $S_2$, and offset signal $S_3$ are input to offset checking circuit 9. Offset checking circuit 9 checks whether offset signal $S_3$ is at a normal level or not from the added signal of collision signal $S_2$ and offset signal $S_3$, and generates offset checking signal $S_4$ whose voltage corresponds to normal or abnormal.

Offset checking circuit 9 outputs offset checking signal $S_4$ at no acceleration force. When offset checking signal $S_4$ exists amplifier circuit 8 and the related power supply circuit of each circuit part are normal.

Amplified oscillating signal $S_1$ is further detected by sensor senstivity checking circuit 10. When sensor sensitivity signal $S_5$ corresponding to detected oscillating signal $S_1$ is output from sensor sensitivity checking circuit 10, sensor unit 5, piezoelectric actuator 6, and oscillator circuit 7 are normal.

BRIEF DESCRIPTION OF THE DRAWINGS

These and other objects and features of the invention will be better understood upon consideration of the following detailed description and the accompanying drawings in which.

DETAILED DESCRIPTION OF THE PREFERRED EMBODIMENTS

Figure 2:
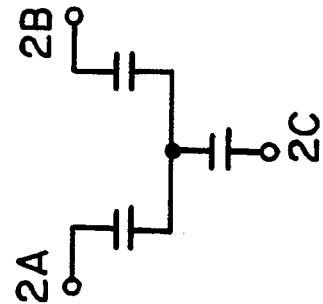
FIG. 2 is an equivalent circuit of the sensor unit according to the invention.
Figure 1:
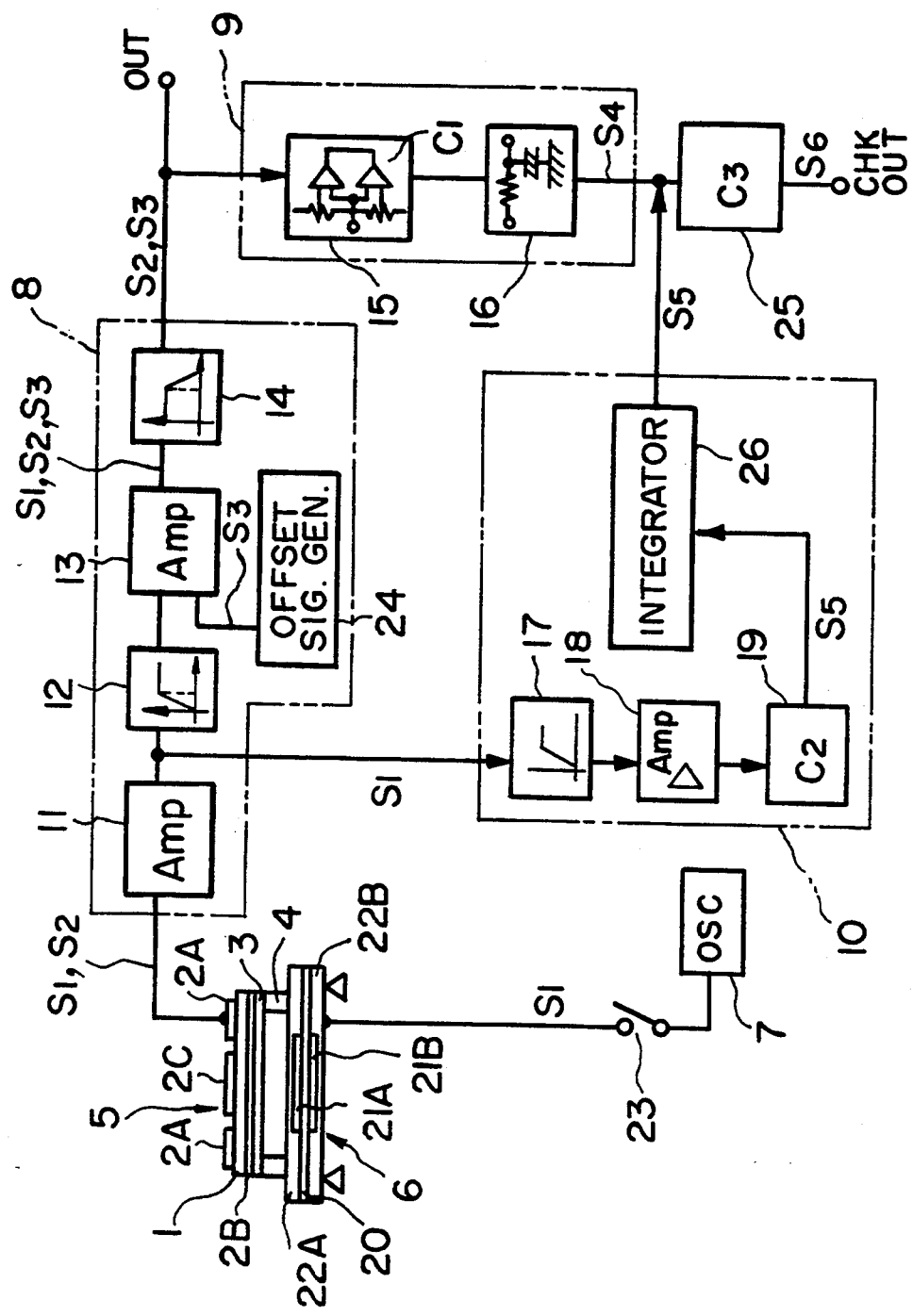
FIG. 1 is a block diagram showing the construction of one embodiment of an acceleration sensor system having a self-checking function according to this invention.

Referring to FIG. 1, the first embodiment of an acceleration sensor system having self-checking function according to this invention is described.

As shown in FIG. 1, in acceleration sensor unit 5, electrode 2A and electrode 2C are provided on one face of peizoelectric element 1. Intermediate electrode 2B is provided on the other face of piezoelectric vibrator 1, and backing material 3, supports frame 4. Piezoelectric actuator 6 such as a peizoelectric vibrator, an electromagnetic vibrator is attached to supporting frame 4 of acceleration sensor unit 5. This piezoelectric actuator 6 has one of electrodes 21A, 21B and backboards 22A, 22B on opposite faces, repsectively.

Oscillator circuit 7 supplies oscillation signal $S_1$ at a frequency such as 5 KHz to electrodes 21A, 21B of piezoelectric actuator 6 via a switch 23. The switch 23 is ON dunis checking and OFF the rest of the time and performs constant monitoring and timing monitoring.

Amplifier circuit 8 amplifies collision signal $S_2$ whose voltage is in proportional to the voltage of signal $S_1$ which is generated from electrode 2A at the collision of a vehicle is an accident. Amplifier circuit 8 also superimposes preset offset signal $S_3$ on the output. This amplifier circuit 8 comprises impedance matching amplifier 11 consisting of FET transistor receiving said oscillation signal $S_1$ and collision signal $S_2$. Highpass filter 12 filters the output of impedance matching amplifier 11. Amplifier 13 receives output signal of highpass filter 12 and offset signal $S_3$, and lowpass filter 14 outputs amplified signal $S_2$, $S_3$. Now assume that the offset signal $S_3$ having 1 V is set by offset signal generator 24.

Offset checking circuit 9 receives amplified collision signal $S_2$, offset signal $S_3$, and detects whether offset signal $S_3$ is at a normal level or not. In offset checking circuit 9, comparator 15 generates a voltage which is at a high level if the level of the composite signal of collision signal $S_4$, and offset signal $S_3$ is within a predetermined range and low level if it is not. The range is determined by a composite signal level at no acceleration force (i.e., the level of a normally produced level of collision signal $S_2$ about offset signal $S_3$). However, sometimes a large amplitude collision signal $S_2$ is generated without the collision of a vehicle, and is erroneously checked as out of the normal range. To avoid this, the output value of comparator 15 is integrated by integrator 16 having a time constant of less than the cut off frequency (1 $H_z$) which eliminates the influence of collision signal $S_2$. This integrated value is output as offset checking signal $S_4$.

Sensor sensitivity checking circuit 10 receives impedance matched and amplified oscillation signal $S_1$ from amplifier circuit 8 and outputs sensor sensitivity signal $S_5$ corresponding to detected oscillation signal $S_1$. Sensor sensitivity checking circuit 10 consists of high pass filter 17 detecting oscillation signal $S_1$ among signals $S_1$, $S_2$ which are output from impedance matched amplifier 11. Amplifier 18 amplifies the output of high pass filter 17 and comparator circuit 19, outputting sensor sensitivity checking signal $S_5$ having a rectangular wave transduced from the output of amplifier 18 by comparing with predetermined levels. Integrator 26 has a time constant that is long enough to integrate the rectangular wave and outputs the integrated value as sensor sensitivity signal $S_5$.

Abnormal checking circuit 25 consists of a comparator comparing the added signal of outputsof integrator 16 and 26, (i.e. added signal of offset checking signal $S_4$ and sensor sensitivity signal $S_5$) with reference voltages and outputs a self-checking signal $S_6$ representative of a normal state if the signal is within a predetermined normal range.

Operation of this embodiment is explained.

Switch 23 is always closed during constant monitoring and is closed a predetermined period of time during timing monitoring.

Oscillating signal $S_1$ generated in oscillator circuit 7 is supplied to both electrodes 21A, 21B on opposite sides of piezoelectric actuator 6 attached to acceleration sensor unit 5. Piezoelectric actuator 6 vibrates at a vibration frequency such as 5 $KH_z$. When a signal corresponding to this oscillating signal $S_1$ is detected from the other electrode 2A of acceleration sensor unit 5, it indicates that sensor unit 5 operates normally. If the oscillating signal $S_1$ is not detected, sensor unit 5 is not normal indicating a fault such as a lead wire broken, a separation of electrodes, etc.

Oscillating signal $S_1$ is input to impedance matching amplifier 11 of amplifier 8 and amplified. Impedance matching amplifier 11 matches the output impedance of electrode 2A of sensor unit 5 and input impedance of highpass filters 12, 17 to achieve oscillating signal $S_1$ transmitted to highpass filters 12, 17 with no transmission loss. Oscillating signal $S_1$ is input to sensor sensitivity checking circuit 10. Collision signal $S_2$ produced by the collision of a vehicle in an accident is input to amplifier 13 together with offset voltage $S_3$, such as 1 V in this example, amplified and output through lowpass filter 14.

Oscillating signal $S_1$ is supplied to highpass filter 17 of sensor sensitivity checking circuit 10 together with the collision signal $S_2$. The hipass filter 17 extracts the oscillating signal $S_1$ and outputs it to amplifier 18. The amplifier 18 amplifies the oscillating signal $S_1$. This amplified oscillating signal $S_1$ is input to comparator circuit 19. The comparator circuit 19 compares it with a predetermined voltage and transduces the oscillating signal $S_1$ into a rectangular wave of 5 $KH_z$. This rectangular wave is integrated by integrator 26 and averaged. The integrated value is output as a sensor sensitivity checking signal $S_5$.

On the other hand, offset signal $S_3$ is supplied to comparator circuit 15 together with collision signal $S_2$, the level checked, and then integrated in integrator 16 for removing the influence of collision signal $S_2$ on the integrated result. The integrated value is output as an offset checking signal $S_4$. An abnormal of this offset checking signal $S_4$ represents an abnormal of each power supply circuit and amplifier circuit 8. On the other hand, an abnormal sensor sensitivity checking signal $S_5$ represents an abnormal of either sensor unit 5, piezoelectric vibrator 6, oscillator circuit 7, or amplifier circuit 8. The added signal of offset checking signal $S_4$ and sensor sensitivity checking signal $S_5$ is supplied to abnormal checking circuit 25. Abnormal checking circuit 25 compares the level of the added signal with a normal value and outputs self checking signal $S_6$ representing the whole operational state of acceleration sensor unit 5 and each relating circuits.

Abnormal checking circuit 25 checks for an abnormal of either one or both of offset checking signal $S_4$ and sensor sensitivity checking signal $S_5$ from the level of the added signal. Therefore, what is represented by the self-checking signal $S_6$ can be chosen. Further offset checking signal $S_4$ and, sensor sensitivity checking signal $S_5$ can be checked separately.

Figure 3:
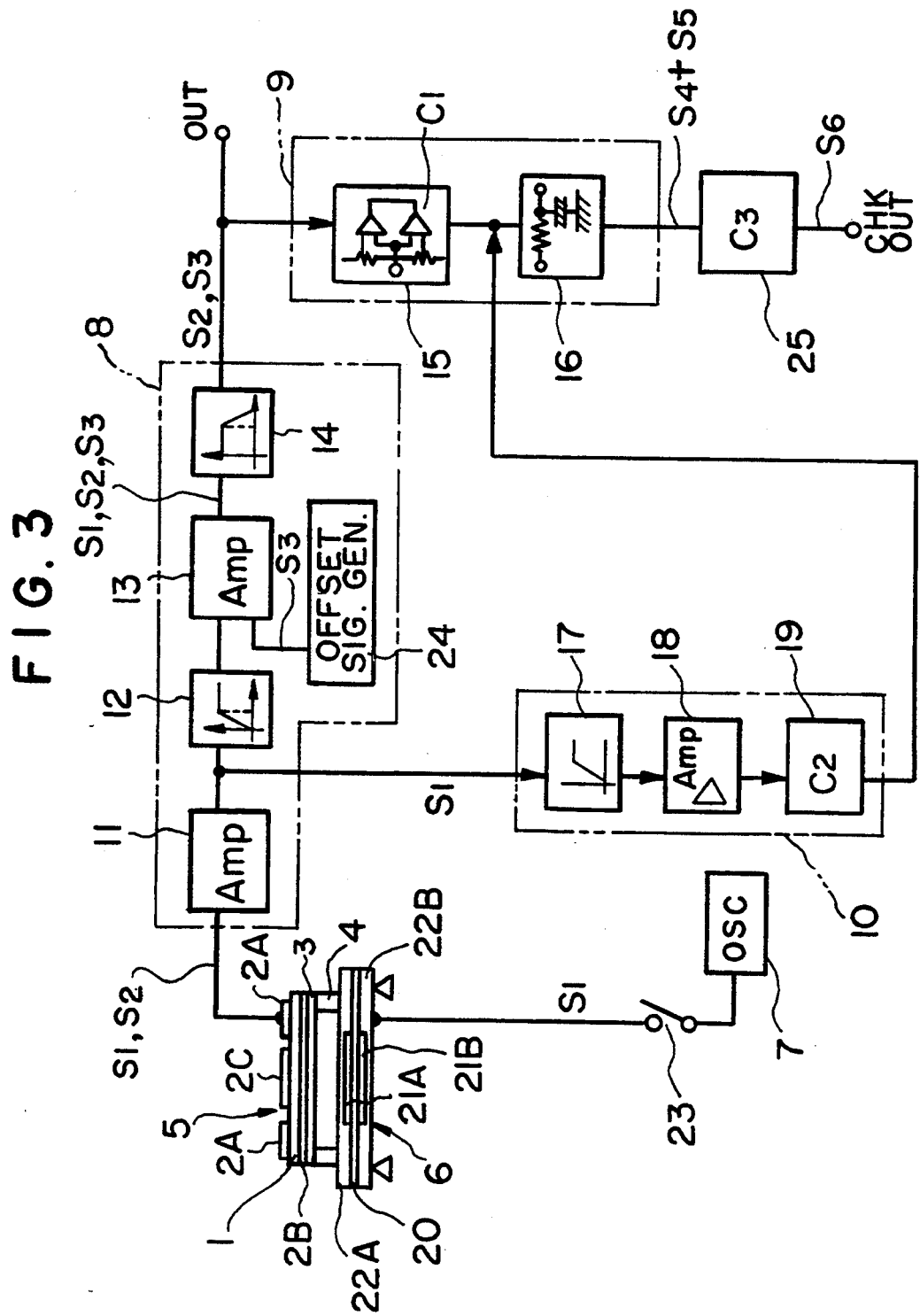
FIG. 3 is a block diagram showing the construction of another embodiment of an acceleration sensor system of the invention.

FIG. 3 shows another embodiment of this invention in which the integration operation of integrator 26 is performed by the integrator 16. Namely, integrator 26 averages the rectangular wave formed oscillation signal $S_1$. On the other hand, a time constant (1 $H_z$) of integrator 16 is low enough to avarage the rectangular wave (5 $KH_z$), therefore the rectangular wave may be directly input to integrator 16.

Collision signal $S_2$ is generated from acceleration sensor unit 5 by the collision of a vehicle in an accident, a superimposed signal of collision signal $S_2$ and oscillating signal $S_1$ is produced. The superimposed signal passes through impedance matching amplifier 11 and the oscillating signal $S_1$ is removed by highpass filter 12 of amplifier circuit 8. The collision signal $S_2$ is amplified in amplifier 13 together with offset voltage $S_3$. The collision signal $S_2$ is output through lowpass filter 14.

Thus, according to this invention, using acceleration sensor unit 5, with electrode 2A and electrode 2C provided on one face of piezoelectric element 1, and intermediate electrode 28 provided on the other face of piezoelectric element 1, and backboard 3, supporting frame 4 and piezoelectric actuator 6 attached to the supporting frame 4 side of acceleration sensor unit 5, it is possible to detect an acceleration force precisely. Moreover, when oscillating signal $S_1$ is input to electrodes 21A, 21B of piezoelectric actuator 6 during vibrating and outputs oscillating signal $S_1$ from electrode 2A of acceleration sensor unit 5, it is possible to check the acceleration sensor unit 5, piezoelectric actuator 6 and oscillator circuit 7.

Amplifier circuit 8 is connected to electrode 2A of acceleration sensor unit 5. With offset checking circuit 9, and sensor sensitivity checking circuit 10 connected to amplifier circuit 8, it is possible to check not only acceleration sensor unit 5 but piezoelectric actuator 6, oscillator circuit 7, related electric power supply circuit of each circuit and amplifier circuit 8.

As explained above, according to this invention, it is possible to check the function of acceleration sensor unit 5 itself and actuator 6 and electronic circuits 7, 8 and their related electric power supply circuit and self check of acceleration sensor sensitivity.

It will be understood that the present invention is not limited to the specific embodiments hereinbefore discussed but extends to all modifications thereof which will occur to those skilled in the art upon consideration of the general disclosure, its illustrative details and the scope of the claims appended hereto.

The above description of the preferred embodiment of this invention and the preferred dimensions thereof are given by way of example only, and numerous modifications can be made by those familiar with acceleration sensors without departing from the scope of the invention as defined in the claims. Indeed, the suggested dimensions are preferred only for the acceleration sensor indicated, and these dimensions should be modified accordingly to accommodate a piezoelectric device of different dimensions or configurations.

The embodiments of the invention in which an exclusive property or privilege is claimed are defined as follows:

What Is Claimed Is:

1. An acceleration sensor unit comprising a planar piezoelectric element support means supporting a planar piezoelectric vibrator to allow vibrations;
   a detecting electrode provided on an upper face of said planar piezoelectric element for picking up a detected signal according to an acceleration force applied to said planar piezoelectric element, an acceleration sensor including an intermediate electrode provided on a lower face of said planar piezoelectric element;
   actuator means for vibrating said piezoelectric element at a predetermined frequency;
   a sensitivity checking circuit generating a sensitivity checking signal representing sensitivity of said acceleration sensor from said detected signal, said sensitivity checking circuit comprising
   filter means extracting a predetermined frequency component from said detected signal and outputting a first filtered signal,
   first amplifier means amplifying said first filtered signal, and
   first comparator means comparing said first filtered signal with a predetermined first value and outputting the compared result as said sensitivity checking signal; the sensor unit additionally comprising
   signal processing circuit generating an acceleration signal representing the applied acceleration force to said acceleration sensor from said detected signal; and
   an operation checking circuit generating a self-checking signal representing an operating state of the sensor unit by checking the operation of said signal processing circuit and said acceleration sensor from said acceleration signal and said sensitivity checking signal.

2. An acceleration sensor unit as claimed in claim 1, in which said signal processing circuit comprises a second amplifier means amplifying said detected signal and outputting a superimposed predetermined offset voltage.
   second filter means eliminatibg a predetermined frequency component from the superimposed predetermined offset voltage output signal of the second amplifier means and outputting said acceleration signal.

3. An acceleration sensor unit as claimed in claim 1, in which said operation checking circuit comprises a second comparator means comparing said accleration signal with a preset second value and outputting a comparing signal,
   adder means adding said comparing signal to said sensitivity checking signal and outputing an adding checking signal,
   checking circuit means integrating said adding checking signal and generating said self-checking signal according to the integrated result.

4. An acceleration sensing system comprising;
   a planar piezoelectric element;
   vibration mounting means mounting said piezoelectric element for vibration;
   a first detecting electrode on a face of said planar piezoelectric element for detecting a signal representing an acceleration force applied to said planar piezoelectric element;
   an intermediate acceleration sensing electrode on another face of said planar piezoelectric element opposite said first detecting electrode;
   vibration actuating means for vibrating said planar piezoelectric element at a predetermined frequency;
   sensitivity checking circuit means for generating a sensitivity checking signal from a detected vibration signal representing the sensitivity of said accelerating sensor, said sensitivity checking circuit means comprising filter means, said filter means extracting a predetermined frequency from a detected input signal and providing a filtered output signal;
   signal processing circuit means for generating an acceleration signal from the detected signal representing the acceleration force applied to said acceleration sensor; and
   operation checking circuit means generating a self-checking signal for checking the operation of said signal processing circuit means and acceleration sensor from said acceleration signal and said sensitivity checking signal, said self-checking signal representing an operating state of said acceleration sensing system.

5. The system according to claim 4 in which said sensitivity checking circuit includes first amplifying means amplifying said filtered signal; comparator means for comparing said filtered signal with a predetermined frequency component from said detected signal, said comparator providing said sensitivity checking signal as an output.

6. The system according to claim 5 in which said signal processing circuit means comprises second amplifier means for amplifying said detected signal and providing an output signal having a superimposed predetermined offset voltage; and second filter means for eliminating a predetermined frequency component from the output signal of said second amplifier means; said filter means providing said acceleration signal.

7. The system according to claim 5 in which said operation checking circuit comprises second comparator means for comparing said acceleration signal with a preset second signal value and providing an output comparing signal; adding means for adding said comparator output signal and said sensitivity checking signal, said adding means providing an added output checking signal; and integrating checking circuit means integrating said added output checking signal, said integrated checking circuit means generating said self-checking signal.

* * * * *